United States Patent [19]
Coombs et al.

[11] 3,717,663
[45] Feb. 20, 1973

[54] 9-ALPHA-METHYL STEROIDS

[75] Inventors: Robert V. Coombs, Chatham; Eugene E. Galantay, Morristown, both of N.J.

[73] Assignee: Sandoz-Wander, Inc., Hanover, N.J.

[22] Filed: July 1, 1971

[21] Appl. No.: 159,005

Related U.S. Application Data

[63] Continuation-in-part of Ser. No. 844,183, July 23, 1969, Pat. No. 3,655,652, and a continuation-in-part of Ser. No. 848,705, Aug. 8, 1969, abandoned.

[52] U.S. Cl.......................................260/397.5, 260/239.55 R, 260/239.55 C, 260/397.3, 260/397.45, 260/397.5, 424/241, 424/243
[51] Int. Cl......................C07c 169/32, C07c 169/34
[58] Field of Search ......./Machine Searched Steroids

[56] References Cited

UNITED STATES PATENTS

| | | |
|---|---|---|
| 2,977,286 | 3/1961 | Laskin et al.............................195/51 |
| 3,102,125 | 8/1963 | Kincl et al. .........................260/397.4 |

OTHER PUBLICATIONS

Jones et al. I. Chem. Soc Jour. p. 2933–35 (1965)
Jones et al., II Chem. Soc. Jour. p. 2156–58 (1958)
Beyler et al., Jour. Org. Chem. Vol. 26 p. 2426–28 (1961)
Fieser et al. Steroids p. 692–696 (1959)
Applezweig Steroid Drugs p. 347 (1964)

*Primary Examiner*—Henry A. French
*Attorney*—Gerald D. Sharkin et al.

[57] ABSTRACT

The compounds are 13-(lower)alkyl-9α-methyl-gonanes which may be aromatically unsaturated or 4-, or 5(10)-mono-unsaturated, e.g. 3-methoxy-9α-methylestra-1,3,5(10)-trien-17-one and 17β-acetyl-9α-methylestra-4-en-3-one. The compounds are useful as pharmaceuticals.

5 Claims, No Drawings

9-ALPHA-METHYL STEROIDS

This is a continuation-in-part of copending application Ser. No. 844,183 filed July 23, 1969 now U.S. Pat. No. 3,655,652 and of copending application Ser. No. 848,705, filed Aug. 8, 1969 now abandoned.

This invention relates to steroidal compounds, and more particularly to 13-alkyl-substituted gonane compounds having a9α-methyl substituent, as well as to methods of preparing such compounds and to intermediates in the preparation of such compounds. This invention also relates to pharmaceutical compositions containing such compounds and to the use of said compositions.

An embodiment of this invention are gonane compounds which may be conveniently represented by the Formula I:

I.

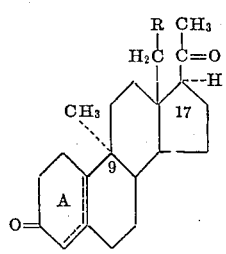

wherein
the dotted lines in the A-ring indicate the presence of a single ethylenically unsaturated unit at either the 4- or 5(10) position; and
R is a hydrogen atom or alkyl having from one to two carbon atoms, i.e., methyl or ethyl.

Compounds I include two sub-classes of compounds depending upon the location of the single unsaturated position in the A-ring; R being as defined above, i.e., Compounds Ia and Ib:

Ia

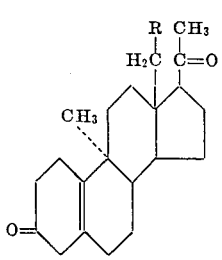

Ib

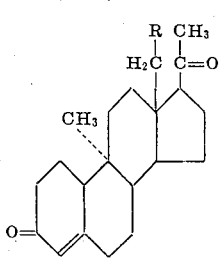

Compounds I are obtainable by hydrolysis-rearrangement of the corresponding Compound II:

II.

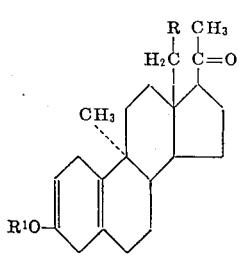

wherein
$R^1$ is tetrahydropyran-2-yl, tetrahydrofuran-2-yl, or lower alkyl, i.e., having from one to four carbon atoms, such as methyl, ethyl, propyl or butyl, including their isomeric forms, but is preferably unbranched.

The above-mentioned hydrolysis-rearrangement is referred to hereinafter as Process 1.

Depending upon whether vigorous acid hydrolysis (step $b$) of a Compound II, or mild acid hydrolysis (step $a$) thereof is employed, either a Compound Ia or a Compound Ib will be obtained. In addition, a Compound Ia may be converted to its corresponding Compound Ib (step $c$); said reaction steps are further described below.

The above-mentioned preparation of Compounds Ia and II are conveniently represented by Reaction Scheme A, below, wherein only the A-rings of the compounds are shown, (as this is the portion of the molecule on which the reaction occurs), and $R^1$ is as defined above:

REACTION SCHEME A

PROCESS 1

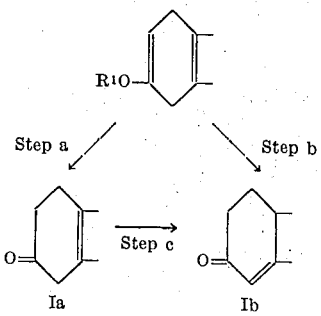

Referring to the above Reaction Scheme A:

Step $a$ is a mild cleavage, effected, preferably with oxalic acid, acetic acid or generally in acid media with pH value above 2 and preferably between 3 and 4; and preferably for a period of less than about 3 hours.

Step $b$ is a more vigorous cleavage, effected, e.g., with oxalic acid or hydrochloric acid, at a pH value lower than that of step $a$ and preferably between 1 and 2.

Step $c$ may be carried out under the same conditions as are described for step $b$, or can be effected by prolonged treatment of a compound Ib, e.g., for a period longer than about 3 hours, under the conditions described for step $a$.

Any of steps $a$, $b$ and $c$ may be carried out at temperatures from, e.g., 0° to 100° C., preferably from 20° to 70° C., if desired in the presence of suitable water-miscible inert organic solvent, such as a lower alkanol, e.g. methanol; however, when the acid reactant is liquid it may be employed in excess to serve as solvent, e.g., acetic acid. Steps $a$ and $b$ should be, and step $c$ is preferably carried out in the presence of water.

If desired steps $a$ and $c$ may be combined so that a compound II is converted to its corresponding compound Ib without recovery of any intermediate compound Ia.

Alternatively, step c may be carried out in a basic medium (step c'), e.g., a compound Ia may be dissolved in a lower alkanol, such as methanol, ethanol, or the like, employing aqueous sodium hydroxide or potassium hydroxide solution of from about 0.01 N to 2N, for from about 1 hour to about 6 hours, e.g. at from 20° to 100°, preferably at reflux, to give the corresponding Ib.

A Compound II is obtainable by oxidizing a 17β-(1'-hydroxyethyl)-substituted analog thereof, i.e. a Compound III. The oxidation of the 1-hydroxyethyl group of a Compound III to an acetyl function (Process 2) may be carried out employing convention methods of oxidizing a secondary alcohol to a carbonyl, e.g. using chromium trioxide in pyridine or acetone; the "Oppenauer Reaction" or silver carbonate in boiling benzene.

A Compound III is obtainable by reducing an aromatic analog thereof, i.e., a Compound IV. The reduction (Process 3) of the aromatic analog, i.e. having unsaturation at the 1,3 and 5(10) positions, to the 2,5(10)-diene may be accomplished by employing the so-called Birch reduction, which broadly involves use of an alkali metal, e.g. lithium, in the presence of a proton donor such as a lower alkanol, e.g. t-butanol or ethanol in liquid ammonia at reduced temperatures (sufficient to maintain the ammonia in a liquid state). If desired, a solvent such as an ether, e.g., tetrahydrofuran can be used; however, the ammonia can serve as the reaction medium.

A Compound IV is obtainable by "hydrating" (Process 4) a 17-ethylidine-3-ether-9α-methylestra-1,3,5(10)-triene, i.e., a Compound V. The "hydration" may be effected by use of a "hydroboration" technique, e.g. by treatment with borane followed by treatment with hydrogen peroxide under basic conditions. The borane reagent may be used as such or in a convenient form, e.g. as a borane-tetrahydrofuran solution.

A Compound V is obtainable by "ethylidenating" a Compound VI, i.e. a 3-ether-9α-methylestra-1,3,5(10)-triene-17-one, with a so-called "Wittig" reagent, i.e. triphenyl-ethyl-phosphonium ylide (Process 5). The Wittig reagent is prepared by reacting a triphenyl-ethyl-phosphonium halide with a strong base, e.g. ethyl-triphenyl-phosphonium iodide with sodium methylsulfinylmethide, in an inert solvent, e.g. dimethyl sulfoxide.

Alternatively, Compound III may be treated according to Process 1 to obtain an intermediate (Compound X)

X

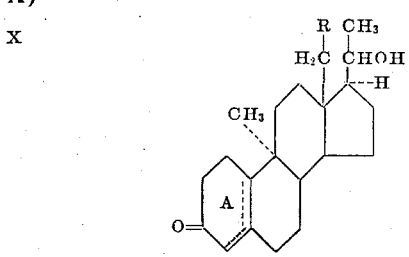

wherein R is as defined above, the dotted lines indicate the presence of a single double bond at either of positions 4 or 5(10), and Compound X may be oxidized (Process 6) at the 17 (1'-hydroxyethyl) radical thereof to obtain the corresponding Compound I. The oxidation may be carried out in the same manner as the oxidation described in Process 2.

The preparation of Compounds II from Compounds VI by the series of Processes 2, 3, 4 and 5 is conveniently represented by Reaction Scheme B, below, wherein R and R¹ are as defined above.

REACTION SCHEME B

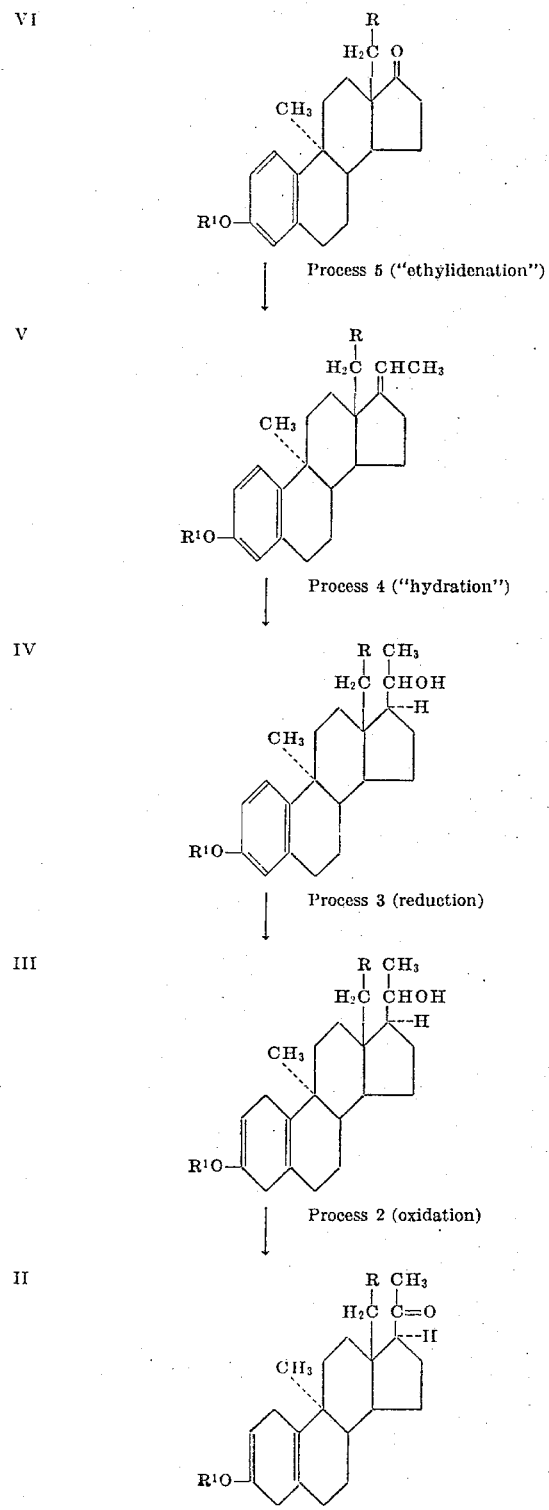

If desired a Compound III or a Compound X which has unsaturation at the 5(10)-position, i.e. a Compound Xa, may be oxidized under acidic conditions to obtain a corresponding Compound Ib. Where a Compound Xa is used, the acidic conditions may be those employed in step c of Process 1, with or without water being present. Where a Compound III is used the acidic conditions may be those employed in step *b* of Process 1. Chromium trioxide in concentrated sulfuric acid, or acetic acid is particularly useful in such reaction.

As will be appreciated, in oxidizing a Compound X*a* to the corresponding Compound I*a*, acidic conditions which would cause rearrangement, should be avoided, as such can result in formation of a Compound I*b*. Accordingly, chromium trioxide in pyridine is particularly useful as oxidizing agent in such reaction.

Compounds VI used in Process 5 may be conveniently obtained starting from Compounds A below by a series of steps, comprising Process 7. Process 7, is represented in Reaction Scheme C, below, wherein R and $R^1$ are as defined above and *n* is 1 or 2.

REACTION SCHEME C

PROCESS 7

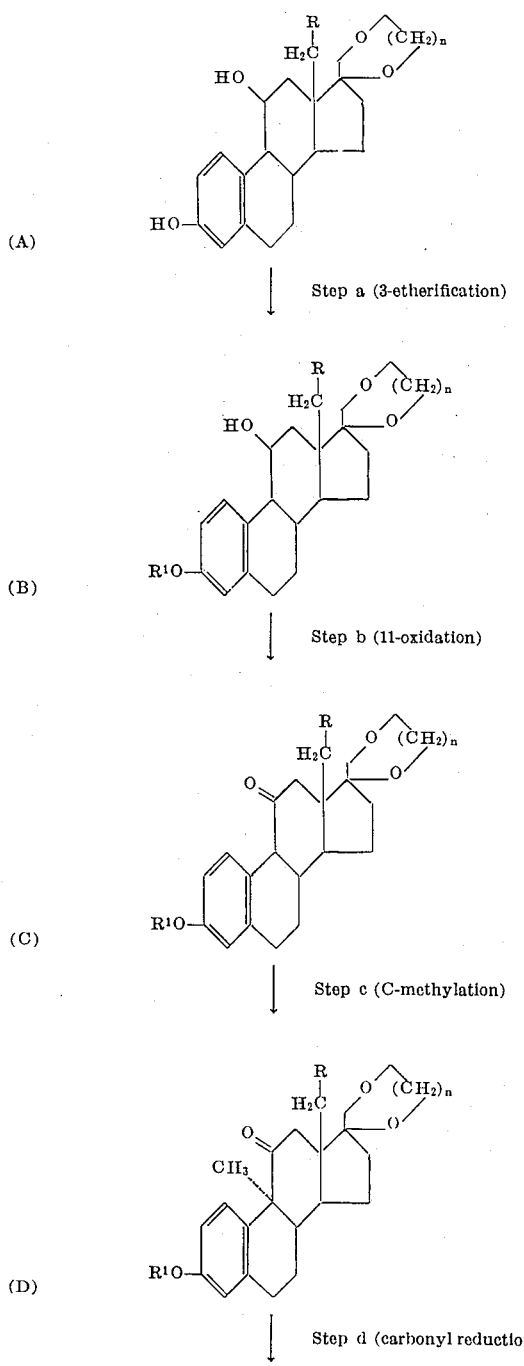

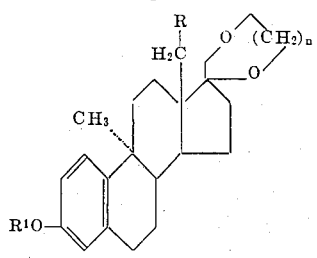

(E)

↓ Step e (17-ketal cleavage)

VI

In process 7 step *a*, may be effected in manner conventional for the etherification of a phenolic hydroxy function. Thus, where $R^1$ is alkyl, the alkylating agent may, for example, be an alkyl iodide having from one to four carbon atoms, and the process conveniently carried out under basic conditions, provided, for example, by the presence of anhydrous potassium carbonate. Suitably, the process is carried out in an inert organic solvent, for example a lower alcohol such as methanol. The reaction temperature may for example be from 60° to 100° C., although preferably the reaction is performed at the reflux temperature of the reaction medium. When an alcohol is used as solvent, it is preferred that the alkyl moieties of the alcohol and the alkylating agent be the same. Compounds B where $R^1$ is tetrahydropyranyl or tetrahydrofuranyl, such may be obtained in a conventional manner, e.g. by reacting a Compound A with dihydropyran or dihydrofuran in the presence of an acidic catalyst, such as p-toluene sulfonic acid or phosphorus oxychloride.

Compounds A are either known and may be prepared by methods described in the literature or where not known may be prepared by known means from known starting materials.

In step *b*, a Compound B, e.g. an 17-ethylenedioxy-3-etherified-9α-methylestra-1,3,5(10)-11β-hydroxy-triene is oxidized to convert the 11-hydroxy position thereof to a carbonyl function. The oxidation of a secondary alkyl hydroxy function to a carbonyl function, may be carried out by conventional methods, e.g. by the so-called Moffat oxidation.

Step *c*, i.e. the C-methylation to obtain e.g. a 17-ethylene-dioxy-3-etherified-9α-methylestra-1,3,5(10)-trien-11-one, may be carried out by reacting a Compound C with a methylating agent in the presence of a strong base at a temperature of from about −10° to 60° C., in a suitable solvent.

The methylating agent, of Step *c*, i.e. a Compound Q may be represented by the formula:

$$CH_3-Z \qquad (Q)$$

wherein

Z is a nucleofugal leaving group, i.e. the acid residue of a mineral acid, other than fluorine, e.g. a halogen atom having an atomic weight of from 35 to 127, or the acid residue of an organic sulfonic acid, e.g. tosylate, or $-O-S-O_3-CH_3$.

The strong base, i.e. a compound S, may be conveniently represented by the formula:

$$M-A \qquad (S)$$

wherein

A is lower alkoxy, e.g. having from one to six carbon atoms, such as methoxy, ethoxy, propoxy, butoxy, pentoxy and hexoxy and their isomeric forms, or the anion $-NH_2, -H$ or $-CH_2SO-CH_3$, and and the like; and M is a alkali metal, e.g. Na or K.

Step c should be carried out in a suitable solvent, e.g. t-butanol or dimethyl sulfoxide; however, where the methylating agent is liquid under the reaction conditions, excess methylating agent may serve as solvent.

It is preferred to employ the methylating agent in excess, particularly in such a large excess that it serves as solvent, i.e. reaction medium, e.g. of the order of from about 10 to 200 fold excess. Z is preferably iodide and MA is preferably potassium t-butoxide.

Reaction conditions conventionally applied to C-methylation reactions are therefore applied, e.g. it is preferred to carry out the reaction in an inert gas atmosphere, e.g. under dry nitrogen.

In step d, a Compound D is reduced to its corresponding Compound E, i.e. the carbonyl function at the 11-position is converted to a methylene unit, by means conventionally employed for reducing a carbonyl to a methylene structure, e.g. the well-known Wolff-Kishner reduction.

In step e, the ketal function at the 17-position of a Compound E is then acid cleaved to yield the corresponding Compound VI, e.g. a 3-etherified-$9\alpha$-methylestra-1,3,5(10)-trien-17-one. Step e may be carried out in the conventional manner for cleaving a ketal linkage, e.g. by refluxing with hydrochloric acid or p-toluene sulfonic acid in methanol.

It will be appreciated that the cleavage step e, if $R^1$ is a tetrahydropyranyl or tetrahydrofuranyl function, may yield a 3-hydroxy-analog of a Compound VI, i.e. a Compound VIa. Hereinafter the term Compounds VI' includes Compounds VI and their 3-hydroxy analogs (VIa), i.e. $R^1$ of Compounds VI is replaced in Compounds VI' with $R^2$ which represents a hydrogen atom or $R^1$. Accordingly, where a Compound VI is desired where $R^1$ is either a tetrahydropyranyl or tetrahydrofuranyl function, such groups can be introduced onto the 3-position of a Compound VIa by a conventional etherification technique such as is described above in connection with step a of Process 7.

It will also be appreciated that in the above described method of preparing Compounds I, the intermediates III and II have a 3-oxygenated-2,5(10)-dien-structure which may be converted to the desired 3-oxo-4- or 5(10)-mono-unsaturated structure as described in Process 1, above. Accordingly, other forms of protection which lead to the Ia and Ib structures are comprehended as within the scope of this invention. However, since such protected forms may be prepared by conventional means from Compounds VIa of this invention and such methods involve extra process steps, the method as outlined in Reaction Schemes B and C is preferred.

Compounds I of this invention are useful because they possess pharmacological properties in animals. In particular, Compounds I have progestational activity and are useful as fertility control agents in war blooded animals, e.g. mammals, and in regulating estrus or menstrual function. The progestational activity of said compounds is indicated by the well-known Clauberg test involving observation of uterine changes in immature female white rabbits.

For the above-mentioned uses Compounds I may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.01 milligram to 30 milligrams. This daily dosage may be given in a single dose or divided doses, e.g. two times a day, or in sustained release form, independent of body weight. Dosage forms suitable for internal administration comprise from about 0.005 milligrams to about 30 milligrams of the compound in admixture with a solid or liquid pharmaceutical carrier or diluent.

The Compounds VI' in addition to their use as intermediates as described above, possess pharmacological activity in animals. In particular, Compounds VI' have estrogenic activity, as indicated by observing increase in white mouse uterine weight, e.g. as described in Endocrinology 65, 265 (1959). The compounds are therefore useful as estrogenic agents, e.g. in fertility control and estrogen replacement therapy. These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.3 milligram to 30 milligrams. This daily dosage may be given in a single dose or divided doses, e.g. two times a day, or in sustained release form, independent of body weight. Dosage forms suitable for internal administration comprise from about 0.15 milligrams to about 30 milligrams of the compound in admixture with a solid or liquid pharmaceutical carrier or diluent.

Compounds D also possess estrogenic activity, and may therefore be used for the same uses and administered in the same manner as described above for Compounds VI', except that daily dosages should be from 1 milligram to 30 milligrams.

A representative formulation suitable for oral administration is a tablet prepared by standard tabletting techniques which contains the following:

| Ingredient | Parts by Weight |
|---|---|
| 3-methoxy-$9\alpha$-methylestra-1,3,5(10)-trien-17-one | 0.5 |
| Tragacanth | 2 |
| Lactone | 89 |
| Corn Starch | 5 |
| Talcum | 3 |
| Magnesium Stearate | 0.5 |

The following examples are provided as illustrative of the present invention. However, it is to be understood that the examples are for the purposes of illustration only and are not intended as in any way limiting the scope of the invention. In the examples all temperatures are Centigrade and room temperature is 25°, unless indicated otherwise.

EXAMPLE 1

$17\beta$-Acetyl-$9\alpha$-methylestra-4-en-3-one

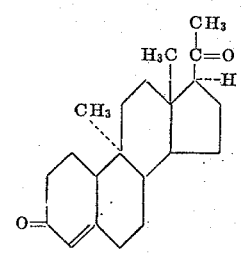

This Example illustrates the preparation of a Compound Ia and Compound Ib.

STEP A: 17-Ethylenedioxy-11β-hydroxy-3-methoxyestra-1,3,5(10)-triene (Compound B by Process 7, step a)

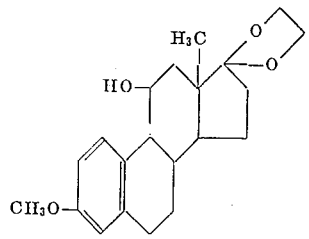

A mixture of 15 g of 17-ethylenedioxyestra-1,3,5(10)trien-3,11β-diol and 30 g of anhydrous potassium carbonate in 75 ml of methanol and 60 ml of methyl iodide is stirred and heated under reflux for 3 hours. The mixture is then cooled and diluted by addition of 200 ml of water. The methanol and methyl iodide are removed by distillation under reduced pressure and the aqueous residue is extracted twice with methylene chloride. The combined organic extracts are washed with saturated sodium chloride solution and dried over sodium sulfate. Removal of the solvent gives a residue which is crystallized from ether to yield 17-ethylenedioxy-11β-hydroxy-3-methoxyestra-1,3,5(10)-triene, m.p. 125°–126°C.

STEP B: 17-Ethylenedioxy-3-methoxyestra-1,3,5(10)-triene-11-one (Compound C by Process 7, step b)

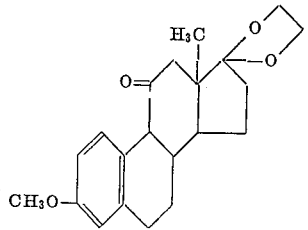

To a stirred solution of 5.13 g of 17-ethylenedioxy-11β-hydroxy-3-methoxyestra-1,3,5(10)-triene in 25 ml of dimethylsulfoxide and 25 ml of benzene is added 3 ml of pyridine and 9.3 g of N,N-dicyclohexylcarbodiimide. This mixture is then cooled and 1.5 ml of dichloroacetic acid is added. The whole is next stirred at room temperature for 1 ½ hours. It is diluted by the addition of 50 ml of ether and a solution of 4 g of oxalic acid in 10 ml of methanol is added dropwise. The resulting suspension is stirred for 40 minutes at room temperature and then filtered. The filtrate is concentrated to dryness and distributed between methylene chloride and a 10 percent aqueous solution of sodium bicarbonate. The organic phase is washed with water and dried (Na₂SO₄) before being evaporated to dryness under reduced pressure. The residue is placed on a column of silica-gel and eluted with chloroform containing various percentages of methanol. The fractions eluted with chloroform containing 5 percent of methanol are combined and evaporated to yield a residue which is crystallized from hexane/ether (1:1). Thus is obtained 17-ethylenedioxy-3-methoxyestra-1,3,5(10)-triene-11-one, m.p. 122°–123°C.

STEP C: 17-Ethylenedioxy-3-methoxy-9α-methylestra-1,3,5(10)-trien-11-one (Compound D by Process 7, step c)

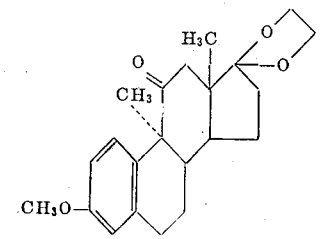

To a stirred, ice cooled solution of 10.5 g of 17-ethylenedioxy-3-methoxyestra-1,3,5(10)-trien-11-one in 300 ml of methyl iodide under an atmosphere of nitrogen is added, over 10 minutes, 120 ml of a 1.1 molar solution of potassium tert.-butoxide in t-butyl alcohol. The temperature is allowed to rise to room temperature and the mixture is then stirred for 18 hours. It is next poured onto 500 ml of water and extracted with methylene chloride, twice. The combined organic extracts are washed with water and dried over sodium sulfate. Removal of the solvent gives an oil which is crystallized from ether to yield 17-ethylenedioxy-3-methoxy-9α-methylestra-1,3,5(10)-trien-11-one, m.p. 142°–145°C.

STEP D: 17-Ethylenedioxy-3-methoxy-9α-methylestra-1,3,5(10)-triene (Compound E by Process 7, step d)

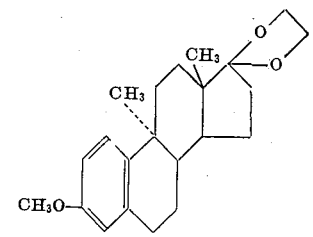

A mixture of 534 mg of 17-ethylenedioxy-3-methoxy-9α-methylestra-1,3,5(10)-trien-11-one, 1 g of hydrazine dihydrochloride and 5 g of hydrazine hydrate in 35 g of triethylene glycol is heated to a temperature of 130° and maintained there for 2 ½ hours. After this time, 1.8 g of potassium hydroxide pellet is added and the temperature raised to 210°. This temperature is also maintained for 2 ½ hours whilst a mixture of hydrazine and water is slowly allowed to distill out. The reaction mixture is cooled and diluted with water affording a precipitate which is collected by filtration. The solid is dissolved in methylene chloride and the organic solution is dried over sodium sulfate. Removal of the solvent leaves a residue which is crystallized from hexane-ether to yield 17-ethylenedioxy-3-methoxy-9α-methylestra-1,3,5(10)-triene, m.p. 115°C.

STEP E: 3-Methoxy-9α-methylestra-1,3,5(10)-trien-17-one (Compound VI by Process 7, step e)

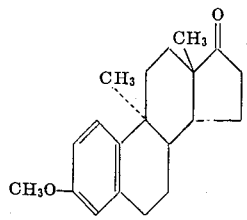

To a warm solution of 220 mg of 17-ethylenedioxy-3-methoxy-9α-methylestra-1,3,5(10)triene in 5 ml of methanol is added 1 ml of 2N hydrochloric acid solution and the mixture is heated under reflux for 5 minutes. On cooling, crystals are precipitated and these are isolated by filtration. The crystalline solid is washed with a small quantity of ether to yield 3-methoxy-9α-methylestra-1,3-5(10)-trien-17-one, m.p. 190°–192°C.

STEP F: 17-Ethylidene-3-methoxy-9α-methylestra-1,3,5(10)-triene (Compound V by Process 5)

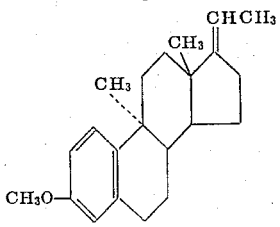

To a (25°) solution of sodium methylsulfinylmethide, prepared in the usual way from 2.4 g of sodium hydride in 45 ml of dimethyl sulfoxide, there is rapidly added a solution of 22.4 g of ethyltriphenylphosphonium iodide in 90 ml of dimethyl sulfoxide. To the resulting deep red mixture, 4.0 g of 3-methoxy-9α-methylestra-1,3,5(10)-trien-17-one is added and kept at 60° for 18 hours. After pouring on ice (200 g) the product is extracted with petroleum ether and purified by filtration of the petroleum ether solution through 13 g of alumina (Grade I).

STEP G: 17β-(1'-Hydroxyethyl)-3-methoxy-9α-methylestra-1,3,5(10)-triene (Compound IV by Process 4)

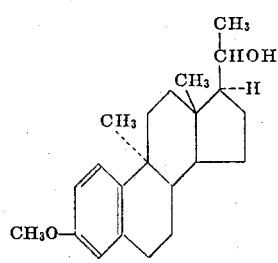

A solution of 17-ethylidene-3-methoxy-9α-methylestra-1,3,5(10)-triene (500 mg) in 30 ml. of tetrahydrofuran is treated with 2.5 ml of an 1.0 M commercial borane/tetrahydrofuran solution. After standing at room temperature for 90 minutes, 6.1 ml of 10 percent sodium hydroxide solution is added, then, dropwise at 0°, 2.5 ml of 30 percent hydrogen peroxide. After 1.5 hours at 0°, water (100 ml) is added and the product extracted with ether.

STEP H: 17β(1'-Hydroxyethyl)-3-methoxy-9α-methylestra-2,5(10)-diene (Compound III by Process 3)

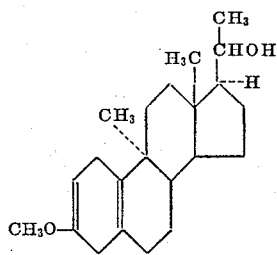

To a solution of 3.6 g of 17β-(1'-hydroxyethyl)-3-methoxy-9α-methylestra-1,3,5(10)-triene in a refluxing (−30°) mixture of 100 ml of liquid ammonia, 30 ml of tetrahydrofuran and 20 ml of tertiary butanol, there is added in small pieces 0.8 g of lithium metal and the resulting mixture held for 3 hours at about −30°. 30 ml of methanol is then carefully added and the ammonia allowed to escape. Ice-cold 0.5 m aqueous NaOH solution is then added (200 ml) and the mixture is then extracted with ether to recover 17β-(1'-hydroxyethyl)-3-methoxy-9α-methylestra-2,5(10)-diene.

STEP I: 17β-Acetyl-3-methoxy-9α-methylestra-2,5(10)-diene (Compound II by Process 2)

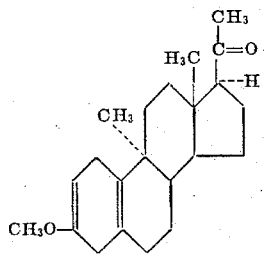

To a mixture of 260 mg of chromium trioxide in 10 ml of pyridine, 302 mg of 17β-(1'hydroxyethyl)-3-methoxy-9α-methylestra-2,5(10)-diene is added and kept 18 hours at 25°. Ice is added and the product extracted with benzene; the benzene solutions are filtered through a short column (10g) of alumina Grade 1–11), evaporated to dryness, and the product crystallized from acetone-hexane (1:1).

STEP J: 17β-Acetyl-9α-methylestra-5(10)-en-3-one (by Process 1, step *a*)

A solution of 1 g of 17β-acetyl-3-methoxy-9α-methylestra-2,5(10)-diene in 80 ml of methanol is admixed with a solution of 1 g of oxalic acid in 20 ml of water and the resulting mixture is kept at 50° for 30 minutes. Following this reaction period, the mixture is concentrated in vacuo to about 20 ml then poured into ice water. The resulting precipitate is collected by filtration, washed with water until neutral then dried. Recrystallization of the dry precipitate from acetone-hexane(1:1) gives 17β-acetyl-9α-methylestra-5(10)-en-3-one.

Step K: 17β-Acetyl-9α-methylestra-4-en-3-one (by Process 1,step *c*)

A solution of 1.0 g of 17β-acetyl-9α-methylestra-5(10)-en-3-one obtainable as described in step *j*, above in 80 ml of methanol is heated, at 40°, with 5 ml of 5 N aqueous hydrochloric acid. After 30 minutes, ice water and 1.0 g of sodium acetate is added, the resulting precipitate is filtered, washed and dried. Recrystallization from methylene dichloride-ether gives 17β-acetyl-9α-methylestra-4-en-3-one.

By replacing the 17-ethylenedioxyestra-1,3,5(10)-triene-3,11β-diol used in step *a* of this example with an approximately equivalent amount of 13-ethyl-17-ethylenedioxygona-1,3,5(10)-triene-3,11β-diol or 13-propyl-17-ethylenedioxygona-1,3,5(10)-triene-3,11β-diol, and following the procedures of steps *a* to *i* of this example there is obtained 17β-acetyl-13-ethyl-3-methoxy-9α-methylgona-2,5(10)-diene or 17β-acetyl-13-propyl-3-methoxy-9α-methylgona-2,5(10)-diene, which by treatment according to step *j* yields 17β-acetyl-13-ethyl-9α-methylgona-5(10)-en-3-one or 17β-acetyl-13-propyl-9α-methylgona-5(10)-en-3-one respectively. Vigorous acid hydrolysis of the 17β-acetyl-13-ethyl-9α-methylgona-2,5(10)-diene or 17β-acetyl-13-propyl-9α-methylgona-2,5(10)-diene according to the procedure of step *k* yields 17β-acetyl-13-ethyl-9α-methylgona-4-en-3-one or 17β-acetyl-13-propyl-9α-methylgona-4-en-3-one, respectively.

Following the procedure of step *a* of this example, but using an approximately equivalent amount of ethanol and ethyl iodine in place of the methanol and methyl iodine used therein, there is obtained 17-ethylenedioxy-3-ethoxy-11β-hydroxyestra-1,3,5(10)-triene, which upon treatment as described in steps *b* to *i* of this example yields 17β-acetyl-3-ethoxy-9α-methylestra-2,5(10)-diene. Treatment of this product according to the procedure of step *j* yields 17β-acetyl-9α-methylestra-5(10)-en-3-one. Vigorous acid hydrolysis of 17β-acetyl-3-ethoxy-9α-methylestra-2,5(10)-diene according to the procedure of step *k* yields 17β-acetyl-9α-methylestra-4-en-3-one.

EXAMPLE 2

17β-Acetyl-9α-methylestra-4-en-3-one

A solution of 1.0 g of 17β-acetyl-9α-methylestra-5(10)-en-3-one, obtainable as described in Steps A to J of Example 1 above, in 10 ml of ethanol is mixed with 10 ml of aqueous 0.1 normal potassium hydroxide solution and the resulting mixture is refluxed for 1 hour. The mixture is then poured on water and the resulting precipitate is filtered, washed with water until neutral and then dried. Recrystallization from methylene dichloried/diethyl either gives 17β-acetyl-9α-methylestra-4-en-3-one.

EXAMPLE 3

17β-Acetyl-9α-methylestra-4-en-3-one

Repeating the procedure described in Step K of Example 1, except replacing the 17β-acetyl-9α-methylestra-5(10)-en-3-one used therein with an approximately equivalent amount of 17β-acetyl-3-methoxy-9α-methylestra-2,5(10)-diene, obtainable as the product of Step I in Example 1, there is obtained 17β-acetyl-9α-methylestra-4-en-3-one.

By repeating the procedure of Step K of Example 1, but replacing the 17β-acetyl-9α-methylestra-5(10)-en-3-one used therein with and approximately equivalent amount of 17β-(1'-hydroxyethyl)-3-methoxy-9α-methylestra-2,5(10)-diene, obtainable as the product of Step H of Example 1, there is obtained 17-(1'-hydroxyethyl)-9α-methylestra-4-en-3-one which by treatment according to the procedure of Step I of Example 1, yields 17β-acetyl-9α-methylestra-4-en-3-one.

EXAMPLE 4

17β-Acetyl-9α-methylestra-4-en-3-one

To 2.7 g of 17β-(1'-hydroxyethyl)-9α-methylestra-4-en-3-one, (obtainable as described in Example 3, above), in 70 ml of dimethylforamide (D.M.F.), there is added 2.7 g of chromium trioxide under cooling, followed by 50 ml of D.M.F. containing 2 ml of concentrated sulphuric acid. The resulting dark red mixture is allowed to stand at room temperature for 2 hours after which it is shaken out with a water/ether mixture. The ether phase is then washed with saturated sodium bicarbonate solution. The ether extract is then dried over sodium sulphate, after which it is evaporated to obtain the title product as a yellow oil which is then crystallized from ether/methylene chloride (5:1).

By repeating the procedure of this example, but replacing the 17β-(1'-hydroxethyl)-9α-methylestra-4-en-3-one used therein with an equivalent amount of 17β-(1'-hydroxyethyl)-3-methoxy-9α-methylestra-2,5(10)-diene, there is obtained 17β-acetyl-9α-methylestra-4-en-3-one.

By repeating the procedure of Step J of Example 1, but replacing the 17β-acetyl-3-methoxy-9α-methylestra-2,5(10)-diene used therein with an approximately equivalent amount of 17β-(1'-hydroxyethyl)-3-methoxy-9α-methylestra-2,5(10)-diene (obtainable by Step H of Example 1), there is obtained 17β-(1'-hydroxyethyl)-9α-methylestra-5(10-en-3-one, which by treatment according to the procedure of this example yields 17β-acetyl-9α-methylestra-4-en-3-one. When 17β-(1'-hydroxyethyl)-9α-methylestra-5(10)-en-3-one is treated in accordance with the procedure of step *i*, there is obtained 17β-acetyl-9α-methylestra-5(10)-en-3-one.

What is claimed is:

1. A compound of the formula:

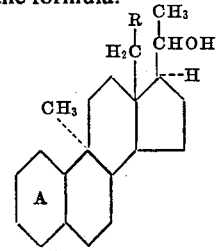

wherein R is a hydrogen atom or alkyl having one to two carbon atoms;
and ring A is:

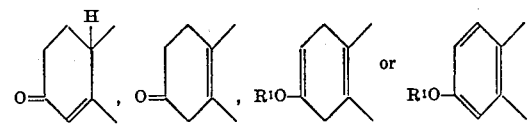

wherein R¹ is tetrahydropyran-2-yl, tetrahydrofuran-2-yl, or alkyl having from one to four carbon atoms.

2. The compound of claim 1 which is 17β-(1'-hydroxyethyl)-3-methoxy-9α-methylestra-2,5(10)-diene.

3. A compound of the formula:

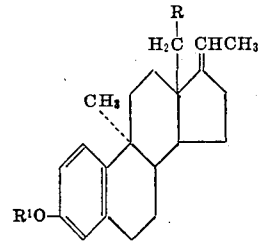

wherein
R is a hydrogen atom or alkyl having one to two carbon atoms; and
R¹ is tetrahydropyran-2-yl, tetrahydrofuran-2-yl, or alkyl having from one to four carbon atoms.

4. A compound of claim 3 which is 17-ethylidene-3-methoxy-9α-methylestra-1,3,5(10)-triene.

5. The compound of claim 1 which is 17β-(1'-hydroxyethyl)-3-methoxy-9α-methylestra-1,3,5(10)-triene.

* * * * *